United States Patent
McClelland, Jr.

(10) Patent No.: US 6,602,322 B2
(45) Date of Patent: Aug. 5, 2003

(54) HIGH TEMPERATURE METAL RECOVERY PROCESS

(75) Inventor: James M. McClelland, Jr., Cornelius, NC (US)

(73) Assignee: Midrex Technologies, Inc., Charlotte, NC (US)

(*) Notice: Subject to any disclaimer, the term of this patent is extended or adjusted under 35 U.S.C. 154(b) by 0 days.

(21) Appl. No.: 09/944,742

(22) Filed: Sep. 1, 2001

(65) Prior Publication Data

US 2003/0047035 A1 Mar. 13, 2003

(51) Int. Cl.$^7$ .................................................. C22B 7/02
(52) U.S. Cl. ........................... 75/590; 75/961; 75/484; 423/107; 423/108; 423/200; 266/157; 266/178; 266/100; 266/207
(58) Field of Search .................. 423/107, 108, 423/200; 75/961, 484, 590; 266/157, 178, 100, 207

(56) References Cited

U.S. PATENT DOCUMENTS

| 4,209,322 A | * | 6/1980 | Janssen et al. | .............. 475/128 |
| 4,756,748 A | * | 7/1988 | Lu et al. | .................... 75/10.19 |
| 5,004,496 A | * | 4/1991 | Aune et al. | .................. 266/148 |
| 5,474,592 A | * | 12/1995 | Bresser et al. | .............. 423/108 |
| 5,547,490 A | * | 8/1996 | Discher et al. | ............. 266/145 |
| 5,980,606 A | * | 11/1999 | Sarma et al. | .................. 75/502 |
| 6,395,060 B1 | * | 5/2002 | Horne et al. | ................. 423/108 |

OTHER PUBLICATIONS

Derwent Acc No. 2001-605205. Abstract for JP 2001179052, published Jul. 3, 2001.*

* cited by examiner

Primary Examiner—Roy King
Assistant Examiner—Tima McGuthry-Banks
(74) Attorney, Agent, or Firm—Dougherty, Clements & Hofer

(57) ABSTRACT

An improved method and apparatus for recovering metal values from Electric Arc Furnace dust, particularly zinc and iron values, by mixing EAF dust and carbonaceous fines to form a particulate mixture; heating the mixture at a sufficient temperature and for a sufficient time to reduce and release volatile metals and alkali metals in a flue gas; collecting the released metals, and removing the metal values from the process as product.

13 Claims, 5 Drawing Sheets

HIGH TEMPERATURE METAL RECOVERY PROCESS

FIELD OF THE INVENTION

The present invention relates to a method and apparatus for recovering metal values from particulate metal-containing dust, and more particularly to a method and apparatus for recovering metal from electric arc furnace dust.

BACKGROUND OF THE INVENTION

Rotary Hearth Furnace processes such as the Midrex FASTMET™ Process, INMETCO process, and Maumee process, and Rotary Kiln processes such as Horse Head and BUS Waelz Kiln, have been developed, marketed, and sold as methods of recovering iron units, zinc and other valuable metallics from large integrated steel mill waste streams. Economical plant capacity for these processes is in the range of 100,000 to 200,000 tonnes of waste processed per year. Mini mills, based on Electric Arc Furnace technology, are typically smaller in capacity than integrated steels mills and produce significantly less waste, ranging from 5,000 to 30,000 tonnes per year. The specific dust waste from Electric Arc Furnace (EAF) operations has been classified by the US Environmental Protection Agency (US EPA) as K061, a hazardous waste requiring special handling, inventory control and approved disposal by US EPA. These special handling requirements and implied liabilities make operation of a large capacity centralized EAF Dust Processing facility cumbersome and undesirable. High Temperature Metals Recovery (HTMR) processing of wastes classified as K061 has been identified by US EPA as the preferred method of treating and delisting.

It is therefore desirable to provide an economical method of thermal treatment of as-generated mini-mill waste located at the site at which such waste is produced.

In 1998, Midrex International BV received U.S. Pat. No. 5,730,775, that teaches an improved method known by the trade name or trademark of FASTMET™, and apparatus for producing direct reduced iron from dry iron oxide and carbon compacts that are layered no more than two layers deep onto a rotary hearth, and are metallized by heating the compacts to temperatures of approximately 1316° to 1427° C., for a short time period. For a general understanding of the recent art, U.S. Pat. No. 5,730,775 is herein incorporated by reference.

In existing rotary hearth and rotary kiln HTMR processes, most of the capital cost is associated with feed preparation equipment necessary to feed the processing furnace, with the fabrication and erection of the furnace itself, and with product handling equipment.

SUMMARY OF THE INVENTION

The invention provides a method and apparatus for recovering principally iron and zinc values from EAF dust. The method of recovering metal values from metal-containing dust, comprises the steps of:
a. mixing metal-containing dust and carbonaceous fines to form a particulate mixture;
b. heating the metal-containing dust and carbonaceous fines mixture on a moving bed horizontal tunnel furnace at a sufficient temperature and for a sufficient time to reduce and release volatile metals and alkali metals therefrom along with gaseous products;
c. collecting the released metals and gases, and reoxidizing the metals; and
d. separating the metal values from the gases and removing the metal values, principally zinc and iron, from the process as product.

The furnace is sealed to prevent the intrusion of ambient air. A baghouse is provided to collect the volatile metals.

The invented process feeds a simple "as is" mixture of EAF dust and carbon fines (coal dust, charcoal, pet coke. etc.) through a feed leg onto a horizontal stroke conveyor. Motion of the conveyor controls the feed rate and distributes the feed evenly across the conveyor pan. Since the pan is not a "moving hearth" the feed area is always cold,. i.e., at ambient temperature. This eliminates the complicated and expensive feed and leveling systems associated with rotary hearth processes.

OBJECTS OF THE INVENTION

The principal object of the present invention is to provide an improved method of achieving rapid and efficient reduction of metal oxide fines and recovery of metal values therefrom.

Another object of the invention is to provide a simple, low-cost method and apparatus for the processing of EAF dust.

Another object of the invention is to provide a reduction furnace apparatus which can be installed on site, or can be fully portable.

A further object of the invention is to provide a fines reduction furnace capable of operating at variable speed Another object of the invention is to provide means for recovering useable zinc oxide from EAF dust.

Another object of the invention is to provide a method which requires no hazardous waste water treatment.

Another object of the invention is to provide a method which produces no hazardous solid waste.

BRIEF DESCRIPTION OF THE DRAWINGS

The foregoing and other objects will become more readily apparent by referring to the following detailed description and the appended drawings in which.

DETAILED DESCRIPTION

Figure 1:
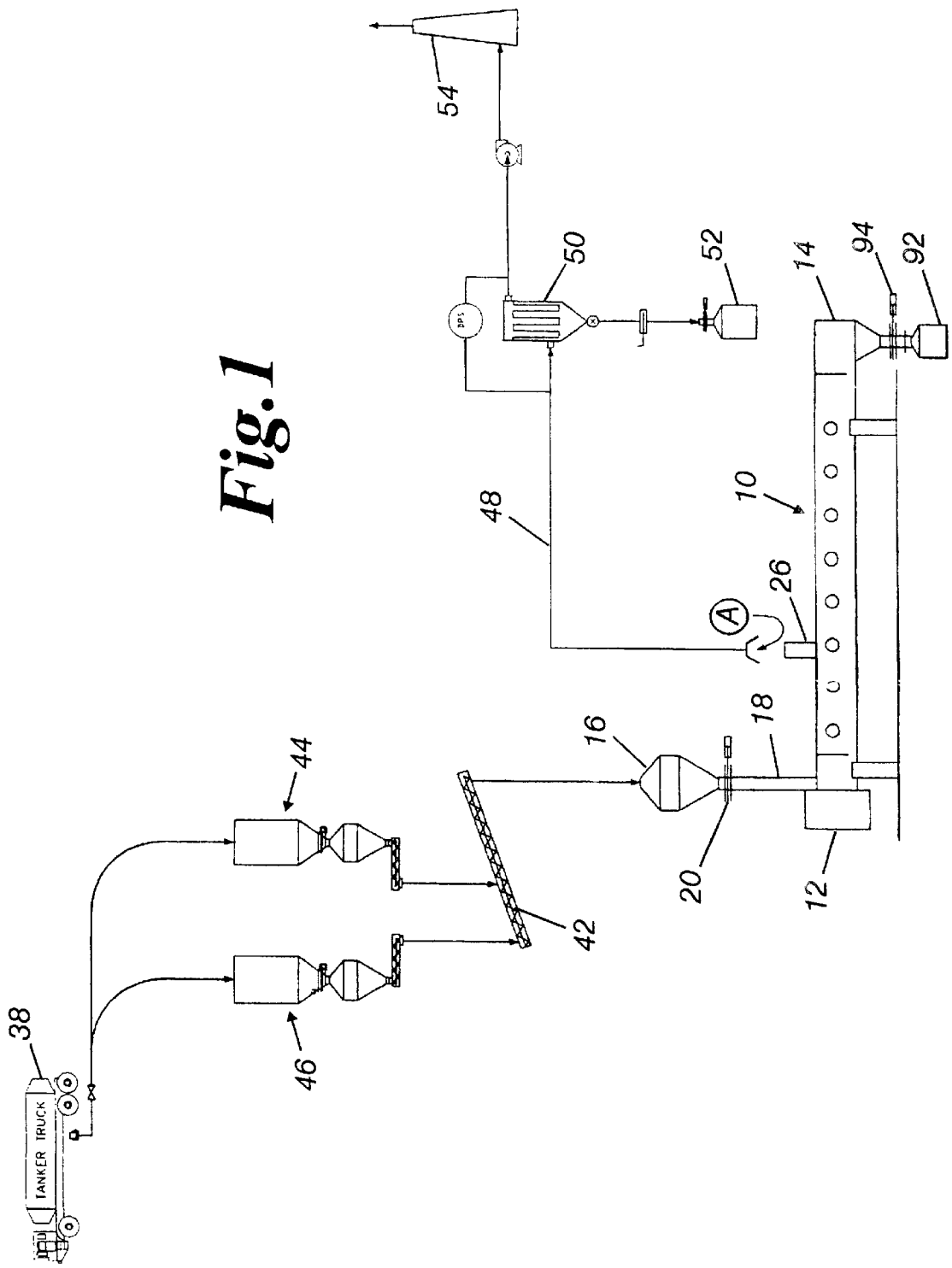
FIG. 1 is a schematic diagram of the invented process.
Figure 2:
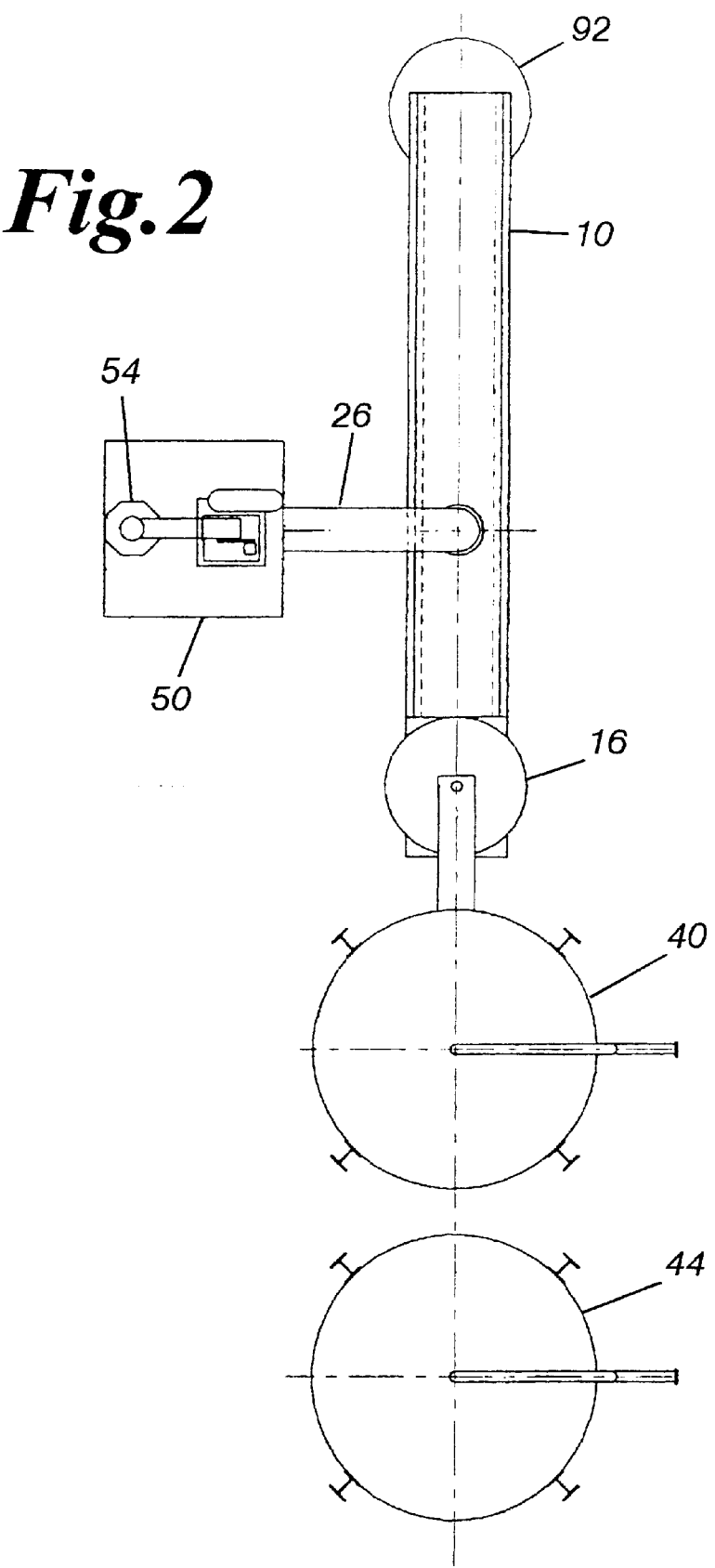
FIG. 2 is a schematic top view of the furnace, feed, and discharge.

As shown in FIG. 1 an elongated reduction furnace 10 has a charging or feed end 12 and a discharge end 14. A feed hopper 16 communicates with the charging end 12 of the furnace which can advantageously be by a seal leg 18 controlled by a sliding gate 20. A horizontal stroke conveyor 22 is positioned in the lower part of the furnace to move the feed material from the charging end through the furnace at a controlled rate. Burners 24 are positioned as shown in the side wall of the reduction furnace to provide the necessary heat for the reduction process. A flue gas offtake 26 is provided in the top wall of the refractory lined furnace.

The furnace 10 is a tunnel furnace and has a suitable side seal 28 such as a flexible connector which provides a seal between the sides of the furnace and the conveyor 22.

Product is discharged from the furnace into a transport vessel 92, the discharge of which product may be controlled by a slide gate 94.

EAF dust is collected in bin 40 and fed to a mixing conveyor 42 along with pulverized reductant from bin 44. The reductant is pulverized or powdered coal, petroleum coke, or charcoal.

Flue gas from offtake 26 has dilution air A provided thereto and the diluted flue gas moves through line 48 to a filter 50. Particulates drop out from the filter which may be a bag filter and are collected in vessel 52. The filtered diluted offgas may then be exhausted to the air through exhaust stack 54.

Figure 3:
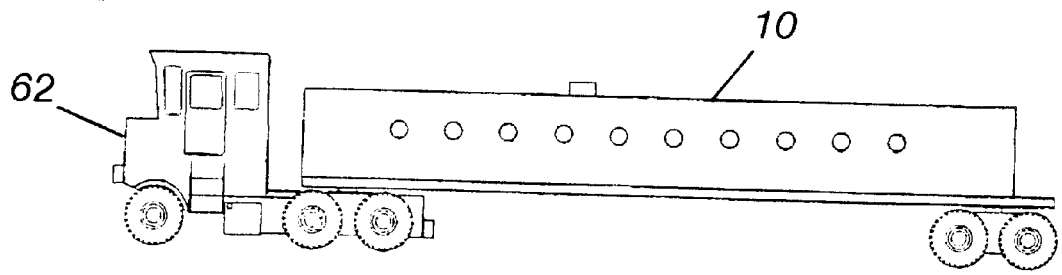
FIG. 3 is side view of the invented processing furnace mounted on a truck.
Figure 4:
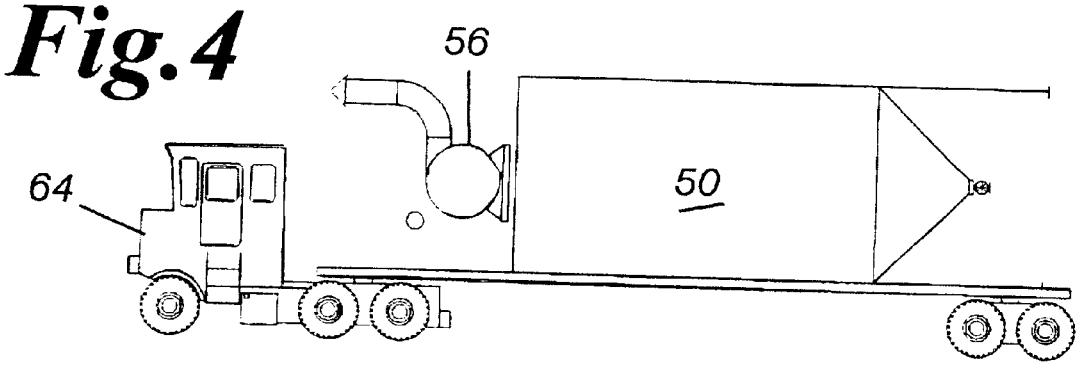
FIG. 4 is side view of the filter equipment of the invention mounted on a truck.
Figure 5:
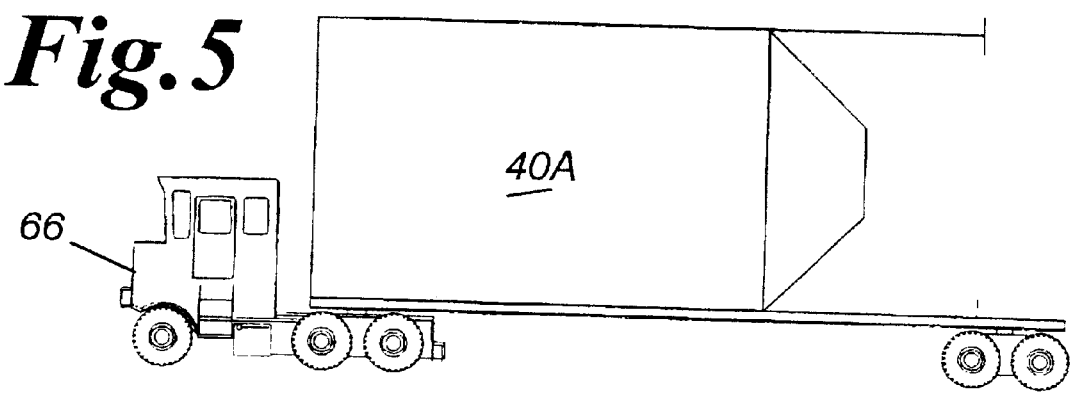
FIG. 5 is a side view of an EAF Dust silo or bin mounted on a truck.
Figure 6:
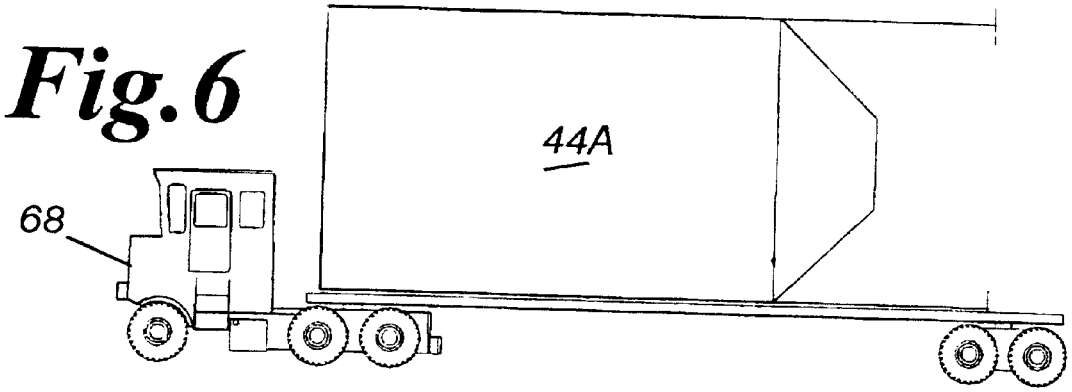
FIG. 6 is a side view of a pulverized reductant bin mounted on a truck.
Figure 7:
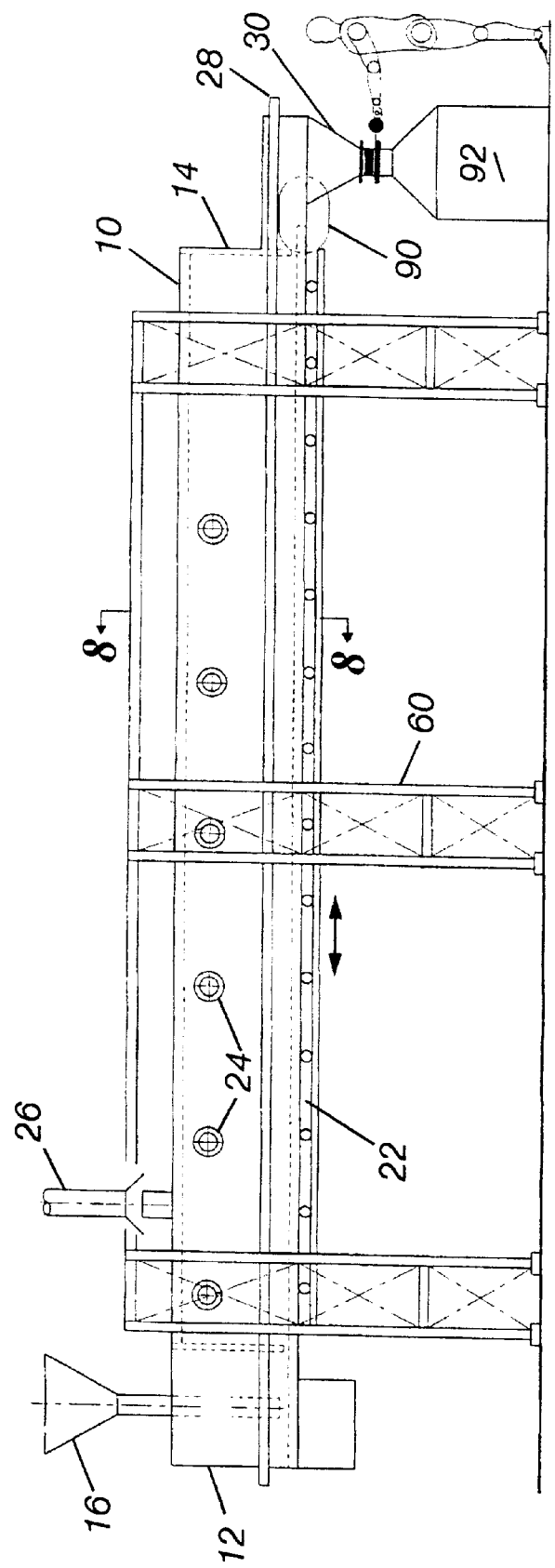
FIG. 7 is a side view of the invented tunnel furnace and associated equipment and supports.
Figure 9:
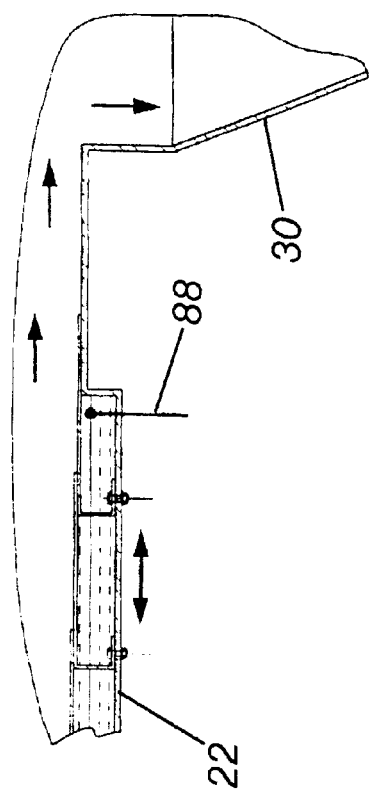
FIG. 9 is an enlarged detail view of the portion of FIG. 7 indicated by oval 90.
Figure 8:
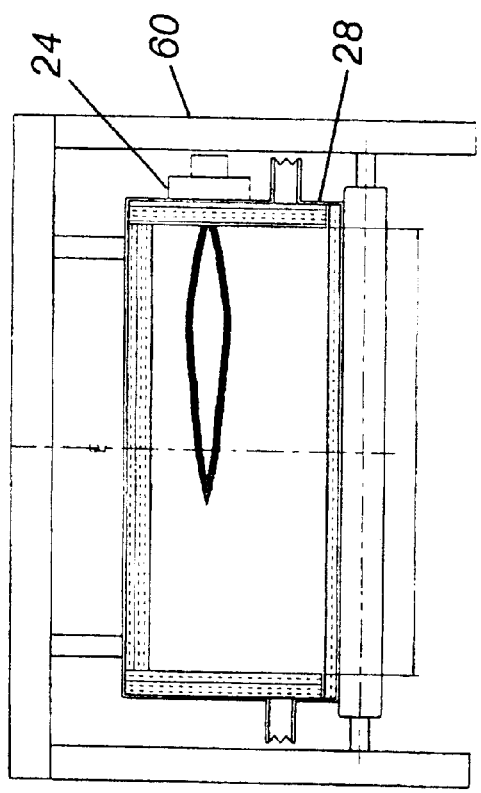
FIG. 8 is a cross-section of the tunnel kiln taken along line 8—8 of FIG. 7.

The reduction furnace can not only be mounted on the ground as shown in FIGS. 1 and 7, but can be truck mounted as shown in FIG. 3. The additional components of the process can also be truck mounted, ie, the offgas treating vessel comprising a bag filter 50 and a fan 56 shown in FIG. 4 and EAF silo or bin 40A shown in FIG. 5 and reductant bin 44A shown in FIG. 6.

The speed of the material flowing through the furnace is controlled by thermocouple 88.

The invention is a low cost plant specifically designed for efficient EAF Dust thermal processing. The invented reduction process utilizes a horizontal motion conveyor 22 in a high temperature tunnel furnace 10 for thermal processing of EAF Dust. The primary goal is recovery of high quality crude zinc oxide. Metallic iron product that is produced may be recycled to an EAF as injectable fines, or it may be briquetted in a briquetting facility, or it may be landfilled, depending on local requirements.

The horizontal conveyor 22 is shop fabricated and installed at the site with minimal foundations and field erection. The horizontal stroke conveyor transports the EAF dust and carbon mixture from the cold feed area through a heated "tunnel kiln" or furnace 10 maintained at 1100 to 1200° C. by a system of burners. Retention time in the heated zone is 10 to 20 minutes.

A thermocouple 88 located under the conveyor pan at the end of the heating zone monitors the temperature of the bottom layer of the dust and carbon mixture and maintains a setpoint by controlling by the frequency of the conveyor stroke. Since the action of the conveyor does not mix the dust mixture, monitoring the temperature of the bottom layer indicates when the reduction and volatile metals release is complete, which is when the lowermost part of the mixture reaches a temperature of about ~1100° C., and this also protects the conveyor pan from damage due to overheating.

Volatile metals (zinc, lead, cadmium, etc.) and alkali metals (sodium and potassium) are released from the dust upon heating, are reoxidized in the flue gas, exhausted from the furnace with the flue gas, and captured by the bag filter. The volatile metals strip sulfur compounds from the flue gas and form metal sulfides that are also captured by the bag filter, thus controlling and limiting $SO_2$ emissions. The flue is quickly cooled from furnace temperatures (~1150° C.) to acceptable bag filter inlet temperature by introducing dilution air (at about a 5:1 air to flue gas ratio). This quick cooling prevents formation of dioxin compounds. The fuel burners are low $NO_x$ by design and are operated with minimum excess oxygen to minimize $NO_x$ generation. No additional emission control devices are required to meet EPA requirements. The particulate captured by the bag filter is rich in zinc oxide (more than 70%) and is sold to zinc refiners as a valuable source of zinc.

Reduced iron product is discharged from the furnace, preferably into a sealed container 92. When the container is full, the sliding gate 94 is closed, the container is removed and replaced with another. The reduced iron product collected in the container may be reintroduced by injectoin into the EAF, or briquetted and fed to the EAF with scrap, or in some cases simply disposed of in land fill. The filled container may be cooled by simply setting it aside under ambient conditions for 12 to 18 hours, or it may be more rapidly cooled by immersion in a water bath.

Plant equipment may be skid mounted for easy erection (and minimum engineering) on a simple, concrete slab foundation.

Bench scale testing has shown that reduction of EAF Dust and release of zinc is feasible under the conditions described by this process. The following table shows recovery of iron units from EAF dust in this process:

| Sample | Description | Total Iron | Metallic Iron | % MET | % C |
|---|---|---|---|---|---|
| A | MET #2 Residue | 52.72 | 41.55 | 78.8 | 2.13 |
| B | MET Dust Mix | 30.23 | — | — | 13.07 |
| C | MET (10 min.) CSM | 45.57 | 35.04 | 76.9 | 3.34 |
| D | MET (12.5 min.) CSM | 53.48 | 43.54 | 81.4 | 2.03 |
| E | MET (15 min.) CSM | 49.95 | 32.18 | 64.4 | 1.52 |

Notes:
A = 7.3 grams of mix heated at 1100° C. for 15 minutes
B is unheated mix-mixing ratio is 84% EAF Dust with 16% Charcoal (ground and dry)
C thru E9 grams of mix heated at 1150° C. Furnace Temperature Alternative Embodiments Alternatively the furnace and related equipment may be truck mounted on a series of trucks as shown in FIGS. 3 through 6, which are then connected with appropriate conduits.

Summary of the Achievement of the Objects of the Invention

From the foregoing, it is readily apparent that I have invented an improved method and apparatus for achieving rapid and efficient reduction of metal oxide fines and recovery of metal values therefrom; a simple, low-cost method and apparatus for the processing of EAF dust, which can be installed on site, or can be fully portable, a fines reduction furnace which is capable of operating at variable speed; which recovers useable zinc oxide from EAF dust; which requires no hazardous waste water treatment; and which produces no hazardous solid waste.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of recovering metal values from metal-containing dust, comprising the steps of:
   a. mixing metal-containing dust and carbonaceous fines to form a particulate mixture and distributing the mixture across a conveyor pan;
   b. heating the metal-containing dust and carbonaceous fines mixture in a moving bed horizontal tunnel furnace at a sufficient temperature and for a sufficient time to reduce and release volatile metals therefrom along with gaseous products;
   c. collecting the volatile metals and gases, adding dilution air, and reoxidizing the volatile metals that in this form are metal values; and
   d. separating the metal values generated from the gases and removing the metal values from the process as product.

2. A method according to claim 1, wherein said carbonaceous fines are selected from the group consisting of coal dust, charcoal, petroleum coke and mixtures thereof.

3. A method according to claim 1 wherein the metal-containing dust is electric arc furnace dust.

4. A method according to claim 1, further comprising cooling the volatile metals by dilution with air.

5. A method according to claim 1, wherein the dilution air effects quick cooling and prevents the formation of dioxin compounds.

6. A method according to claim 1, further comprising heating the metal-containing dust and carbonaceous fines mixture at a sufficient temperature and for a sufficient time to reduce iron contained therein to metallized iron particles, and collecting said metallized iron particles.

7. A method according to claim 6, further comprising maintaining said temperature in the range of 1100 to 1200° C.

8. A method according to claim 6, further comprising heating said mixture for a period of 10 to 20 minutes.

9. Apparatus for recovering metal values from particulate metal-containing dust, comprising:
   a. a sealed horizontal furnace chamber having a horizontal conveyor situated therein;
   b. means for feeding and distributing finely divided metal-bearing particulate material onto said conveyor pan;
   c. means for direct-fired heating particulate material on said conveyor;
   d. means for monitoring the temperature of the particulate material on said conveyor pan;
   e. means for controlling by a frequency of said horizontal conveyor, therein maintaining a temperature set point;
   f. means for reducing metal values within the metal-bearing particulate material to metallized product;
   g. means for separating volatile metals from finely divided metal-bearing particulate material containing iron;
   h. means for discharging and collecting said metallized product; and
   i. means for adding dilution air.

10. Apparatus according to claim 9, further comprising means for cooling and removing volatile and alkali metals.

11. Apparatus according to claim 9, wherein said apparatus is fully portable.

12. Apparatus according to claim 11, said portable apparatus is transported by truck.

13. A method according to claim 1, wherein said method is fully portable.

* * * * *